United States Patent [19]
Hozumi

[11] Patent Number: 5,710,950
[45] Date of Patent: Jan. 20, 1998

[54] AUTOMATIC EXPOSURE CAMERAS WITH IMPROVED APERTURE STOP SIGNAL

[75] Inventor: Toshiaki Hozumi, Tokyo, Japan

[73] Assignee: Nikon Corporation, Tokyo, Japan

[21] Appl. No.: 497,712

[22] Filed: Jun. 30, 1995

[30] Foreign Application Priority Data

Sep. 7, 1994 [JP] Japan .................... 6-214102

[51] Int. Cl.$^6$ .................................................. G03B 17/00
[52] U.S. Cl. .................................... 396/263; 396/264
[58] Field of Search ............................. 354/451, 452, 354/448, 446, 271.1; 396/263–265, 502

[56] References Cited

U.S. PATENT DOCUMENTS

| | | | |
|---|---|---|---|
| 4,918,538 | 4/1990 | Saito et al. | 358/335 |
| 5,057,859 | 10/1991 | Ishimaru | 354/400 |
| 5,115,319 | 4/1992 | Arai et al. | 358/228 |
| 5,140,358 | 9/1992 | Tokunaga et al. | 354/400 |
| 5,459,511 | 10/1995 | Uehara et al. | 348/335 |

*Primary Examiner*—Safet Metjahic
*Assistant Examiner*—Eric Nelson

[57] ABSTRACT

An automatic exposure camera having a continuous shooting capability includes a signal generator generating signals in accordance with the operation of an aperture, a measuring unit counting the signals generated by the signal generator for a specified period of time and a storage unit storing the signals generated by the measuring unit. During continuous shooting operations, an initial picture taking operation is controlled in accordance with the signals generated according to the operation of the aperture, and subsequent picture taking operations are controlled in accordance with the signals generated according to the operation of the aperture within a specified period of time during the initial picture taking operation and which are stored in the storage unit. Additionally provided is a method for controlling the aperture operations of an automatic exposure camera having a continuous shooting mode of operation. The method includes, but is not limited to, generating signals in accordance with the operation of an aperture of the camera, counting the signals over a specified period of time and storing the generated signals so that during continuous shooting operations, an initial picture taking operation is controlled by signals generated in accordance with the operation of the aperture, and subsequent picture taking operations are controlled by signals generated according to the operation of the aperture within a specified period of time during the initial picture taking operation and which are stored during the storing step.

15 Claims, 4 Drawing Sheets

AUTOMATIC EXPOSURE CAMERAS WITH IMPROVED APERTURE STOP SIGNAL

BACKGROUND OF THE INVENTION

1. Field of the Invention

The present invention relates to an automatic exposure camera and, more particularly, to an automatic exposure camera which has improved aperture stop signal generation.

2. Description of the Related Art

Motor drive devices typically have been combined with conventional single-lens reflex ("SLR") cameras to provide auto-shooting capabilities (i.e., continuous photographic operations in rapid succession). As such, aperture control signals typically were computed at times of photometry and in an open aperture status of a picture taking lens. After the aperture was set to an appropriate setting based on photometry and the like, an exposure was conducted through appropriate shutter operation. The typical configuration was such that after the exposure was completed, the aperture then had to be returned to an original starting or open position so that appropriate settings for subsequent photographic operations could be performed.

The return operation that was typically performed to return the aperture to an original or starting position usually brought about a change in the luminous intensity of the lens due to fluctuations of a return initiation signal that was caused due to the vibration of the mechanical units that bring about such a return operation. Moreover, after the return operation was performed, the camera would again repeat such operations after successive photographic operations.

Accordingly, as the return operation needed to be carried out after each photographic operation, the speed of auto-shooting was limited to the speed of carrying out such a return or resetting operation.

In an attempt to solve the aforementioned problem, Japanese Laid-Open Patent Publication Number Sho 58-111023 discloses a system incorporating aperture priority control. Such control is performed so that continuous shooting speed can be raised without returning an aperture to a starting or open aperture position after each photographic operation.

With all of the prior art devices contemplated above, the following problems could not be avoided. For example, in conventional cameras, the available modes for controlling an aperture normally include a program mode and a shutter priority mode, and the modes for controlling the shutter speed include a program mode and an aperture priority mode. It is well known that in a manual mode, setting of the aperture value and the shutter speed are performed together, but automatic control cannot be performed at the same time.

Under such conditions, when taking pictures after selecting and setting the shutter priority mode, control is performed in shutter priority for the initial picture taking operation, but in the next picture taking operation, aperture priority goes into effect. As such, while the aperture value is controlled for an initial operation, the shutter speed is also controlled, and the following type of problem develops.

Suppose a subject is a moving body and a 1/250 shutter speed is set, and an aperture value of F8 is obtained. While following the subject, it may become dark, such as when the subject enters a shaded area. Accordingly, there are disadvantages in that a 1/60 of a second shutter speed may go into effect to correspond to the F8 setting, and because the subject is a moving body, a blurred photograph results.

SUMMARY OF THE INVENTION

Accordingly, it is an object of the present invention to solve the aforementioned problems, and to provide an automatic exposure camera in which photographic operations are carried out without the negative effects associated with aperture control operations.

It is still another object of the present invention to provide an automatic exposure camera which performs continuous shooting mode photography based on shutter priority and not on aperture operation priority.

It is yet a further object of the present invention to provide an automatic exposure camera which performs aperture control in relation to a particular photographic operation based on aperture control of previous photographic operations.

It is still yet another object of the present invention to provide an automatic exposure camera in which aperture control is performed for a particular photographic operation without having to return the aperture to an initial or starting position for each photographic operation.

Additional objects and advantages of the invention are set forth in part in the description which follows, and, in part, will be obvious from the description, or may be learned by practice of the invention.

Objects of the present invention are achieved in an automatic exposure camera that has a continuous shooting capability and which includes, but is not limited to, a signal generator generating signals in accordance with the operation of an aperture, a measuring unit counting the signals generated by the signal generator for a specified period of time and a storage unit storing the signals generated by the measuring unit. During continuous shooting operations, an initial picture taking operation is controlled through the generation of signals according to aperture operation, and subsequent picture taking operations are controlled through signals generated according to the aperture operation within a specified period of time during the initial picture taking operation and which are stored in the storage unit.

Objects of the present invention also are achieved by an automatic exposure camera that has a continuous shooting capability and which includes, but is not limited to, a signal generator generating signals in accordance with the operation of an aperture, a measuring unit counting the signals generated by the signal generator for a specified period of time and a storage unit storing the signals generated by the measuring unit. During continuous shooting operations, an initial aperture operation is controlled based on signals generated by the signal generator and subsequent aperture operations are controlled based on the signals stored by the storage unit.

Objects of the present invention are further achieved by a method for controlling an aperture of automatic exposure camera adapted for use with a camera having a continuous shooting mode of operation. The method includes, but is not limited to, generating signals in accordance with the operation of an aperture system of the camera, counting the signals generated during the generating step for a specified period of time and storing the generated signals so that during continuous shooting operations, an initial picture taking operation is controlled through the generation of signals according to aperture operation, and subsequent picture taking operations are controlled through signals generated according to the aperture operation within a specified period of time during the initial picture taking operation and which are stored during the storing step.

BRIEF DESCRIPTION OF THE DRAWINGS

The above-mentioned and other objects and advantages of the present invention will become apparent and more readily appreciated from the following description of the preferred embodiments, taken in conjunction with the accompanying drawings of which.

DETAILED DESCRIPTION OF THE PREFERRED EMBODIMENT

Figure 1:
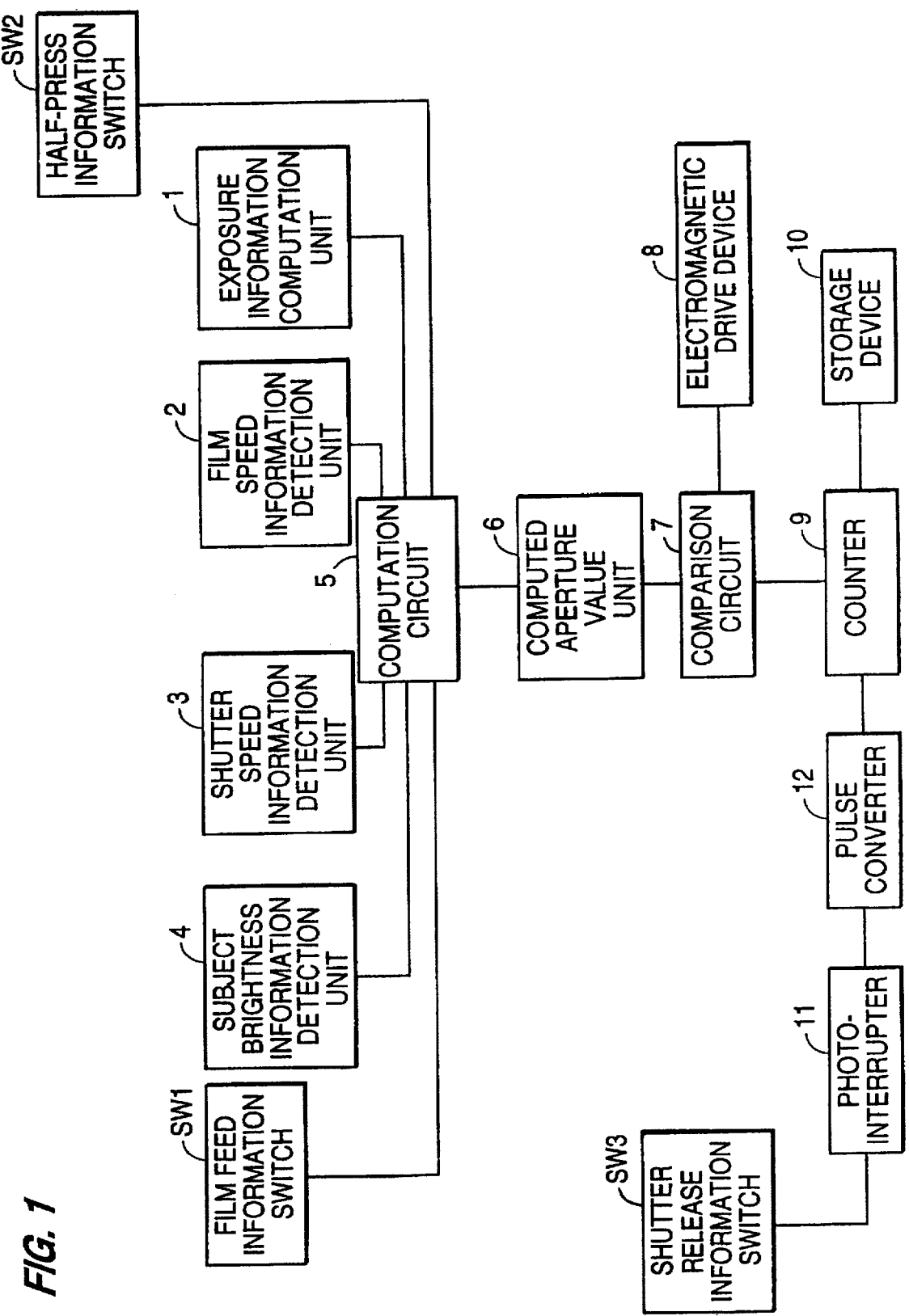
FIG. 1 is a block diagram of an automatic exposure camera according to a preferred embodiment of the present invention.

The following description is provided with reference to the drawing figures which were briefly described above. Like parts are referred to by like reference numerals.

FIGS. 1 through 5 illustrate a preferred embodiment of an automatic exposure camera according to the present invention.

Referring now to FIG. 1, therein illustrated is a block diagram of a preferred embodiment of the present invention. More particularly, the camera includes an exposure information computation unit 1, a film speed information detection unit 2, a shutter speed information detection unit 3 and a subject brightness information detection unit 4. Units 1-4 provide their respective outputs as inputs to a computation circuit 5.

Information (e.g., signals) from a film feed information switch SW1, which is attached in the film running path or to the film winding spool (not shown), and from the half-press information switch SW2 of a half-press operation of the release button are also inputs to computation circuit 5.

In computation circuit 5, the shutter speed and the aperture value are computed by computation circuit 5 from information set by units 1-4 and according to the camera's photographic mode and then are output as the computed aperture value from the computed aperture value unit 6. The aperture computation value from the computed aperture value unit 6 is input to a comparison circuit 7 which acts as a comparison control unit.

SW3 illustrates the shutter release information switch, which senses the fullpress operation of a shutter release button (not shown). The configuration is such that the movement of the shutter release switch is detected by a photointerrupter 11 which acts as a detection signal generating unit. The generated signal from photointerrupter 11 is measured by a counter 9 according to pulse signals from a pulse converter 12. The measured value in counter 9 is sent to or delivered to the comparison circuit 7, and then stored in the storage device 10 as drive control signals to drive an electromagnetic drive device 8.

The operations that occur during picture taking with the camera according to the preferred embodiment of the present invention are as follows.

The camera first goes into operating status when a power switch (not shown) is turned ON. Single mode (e.g., normal single frame photographic mode) and continuous mode (e.g., continuous shooting mode) are the photographic drive modes available immediately after power-up of the camera.

Figure 2:
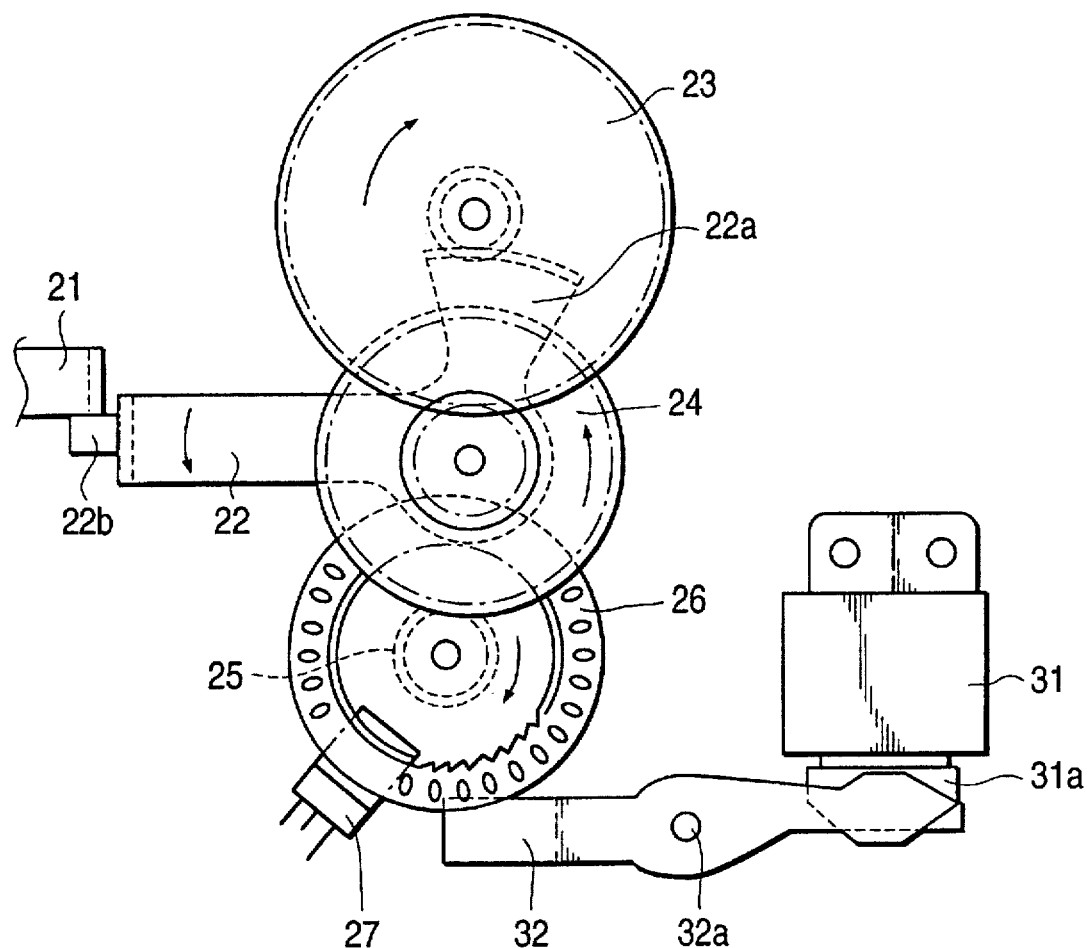
FIG. 2 is a diagram that shows the signal generating unit of the automatic aperture exposure camera system depicted in FIG. 1.
Figure 3:
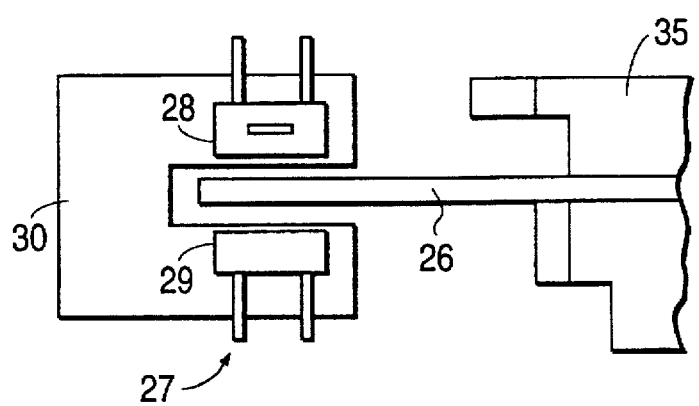
FIG. 3 is a diagram that illustrates the signal generating unit of FIG. 2.

The operations that occur in single mode are explained first and with reference to FIGS. 2 and 3.

The film feed information switch SW1 is OFF during single mode operations. When the half-press information switch SW2 is turned ON, the shutter speed and the aperture value are computed in accordance with subject brightness information and film speed information.

When the shutter release information switch SW3 is turned ON, mirror raising and aperture shut down operations are started by means of a motor or a spring (not shown).

The aforementioned type of aperture control method is performed by detecting movement of the aperture on a lens side of a camera by means of a device such as a photointerrupter 11 which generates a shut down signal. The shut down signal is converted into pulses by means of a pulse converter 12. Thereafter, the pulses are added in counter 9 so that the electromagnetic drive device 8 that drives the aperture is stopped at the point where the number of pulses matches the control value in the comparison circuit 7.

With particular reference to FIGS. 2 and 3, a lever 21 is connected to the member for shutting down the aperture in the photographic lens. When shut down, lever 21 moves in the direction of the arrow. Through the movement of lever 21, a pin 22b, which is embedded in a fan-type gear 22, is brought into contact with lever 21, and fan-type gear 22 rotates.

Rotation of gear 22, is transmitted to the detection gear 25 via a fan-type gear section 22a of the fan-type gear 22 and idle gears 23 and 24. Detection gear 25 becomes linked with a disk 26, which has multiple radially positioned slits.

As seen in FIG. 3, a photointerrupter 27 comprises a disk 26, a light emitting diode 28 and a phototransistor 29 which are positioned in opposition around the aforementioned slit rotation area. Photointerrupter 27 corresponds to the aforementioned photointerrupter 11 in FIG. 1.

In a camera with the aforementioned type of configuration, disk 26 is rotated by shutting down of the aperture. Accordingly, a signal corresponding to the amount of shut down is output from the phototransistor 29, and is converted into pulses by the pulse converter 12. Thereafter, the pulses are counted by counter 9.

In the comparison circuit 7, the count value in counter 9 is compared with the aperture computation value from computed aperture value unit 6 (i.e., the shut-down signal), and the electromagnetic drive device 31 is driven to stop the aperture at a point when the signals and the computed value match.

The driving of the electromagnetic drive device 31 rotates a stop lever 32, which is supported by a shaft 32a of the electromagnetic drive device and which stops the front end stopping claw of the stop lever 32 on the teeth of gear 25. This operation causes the rotation of gear 25 to be stopped. Additionally, lever 32 is stopped at the changed position, and the aperture is stopped in a shut down status which conforms to the control value output from comparison circuit 7.

Referring again to FIGS. 2 and 3, also provided is a device securing section 30 and support section 31a for electromagnetically coupling the device securing section 30 with lever 32 to the drive device 31.

With the aforementioned construction, after the aperture is controlled, a shutter opening and closing operation, which has been determined in advance, is performed to carry out photographic operations. Thereafter, one frame of film is wound through the film winding operation as shutter charging for the next picture taking operation is performed. Along with the film winding operation, a mirror return operation includes returning the mirror to a starting position by a mechanism which is not shown in the diagram, and returning the aperture to its original open status.

The aforementioned configuration is such that when the status of the shutter release information switch SW3 does not change back to ON once it has been changed to OFF due to motor drive being in single mode, the next shutter release is not possible.

The foregoing discussion was concerned with single mode film winding. Next, winding in a continuous shooting mode is explained.

Continuous mode shooting operates in the same manner as single mode shooting up until the initial release of a shutter release button. What is different with continuous mode shooting is that the number of pulses generated within a specified period of time after shut down of the initial shutter release operation is stored in storage device 10 (e.g., a storage unit such as a volatile memory unit like a random access memory "RAM" or other similar structure).

More particularly, the specified period of time is the time during which the effects from a return operation of an aperture to its initial starting position could be realized. Such a return is performed simultaneously with a mirror return operation in the previous picture taking operation. That is, because there is a possibility that the pulse count will be mistaken in the next shut-down operation, the configuration is such that control is performed with the stored value of the pulses generated within the specified period of time and obtained in the initial picture taking operation without counting the generated pulses for the specified period of time. The number in the storage device is not limited to a single number, and there may be multiple numbers which are stored depending on design requirements.

Aperture release and control within a specified period of time are practically not a problem, since the pulse generating status is stored. In particular, pulse generating status is as follows.

Figure 4:
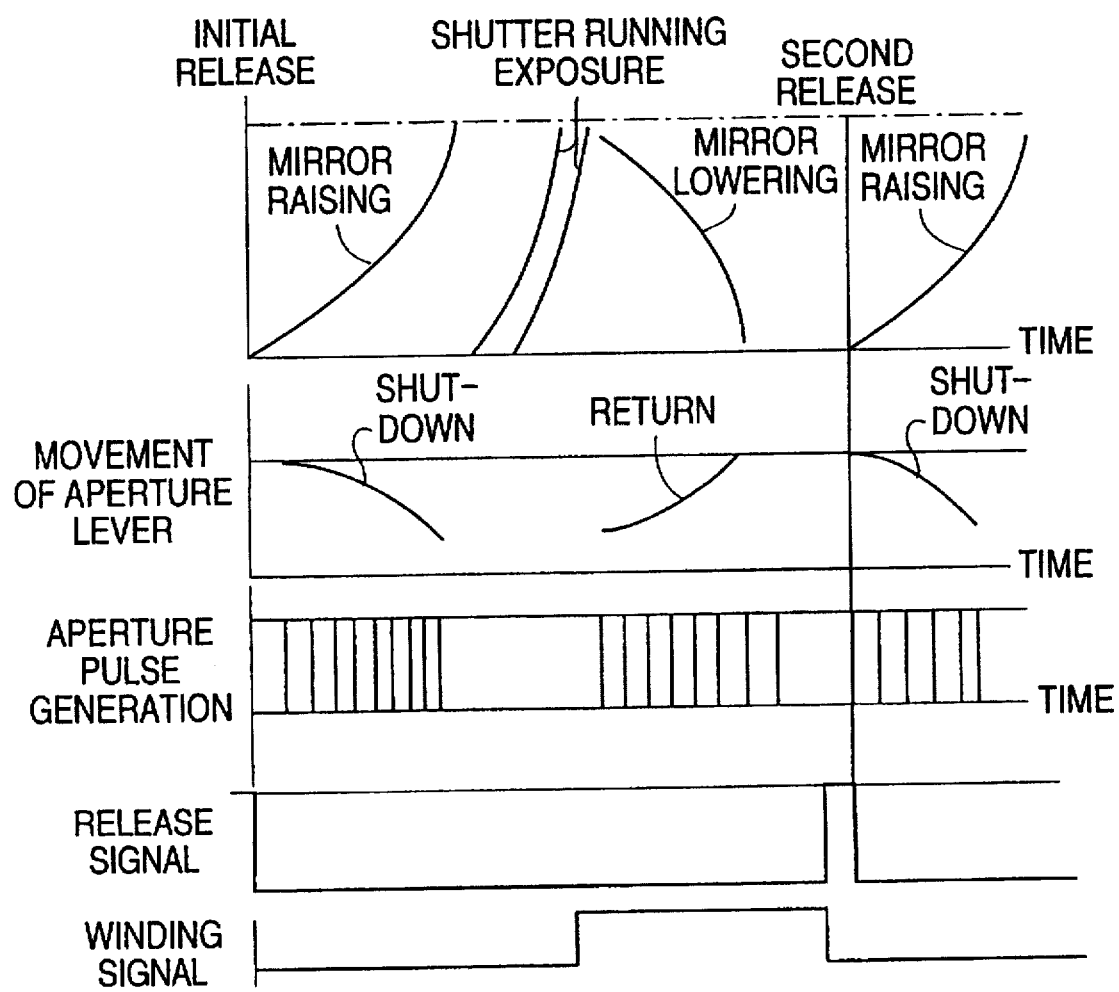
FIG. 4 is a chart that illustrates the aperture pulse generating status realized during single photographic mode shooting (i.e., when pulses are not stored for subsequent photographic operations).

Referring now to FIG. 4, therein depicted is a chart illustrating the case of single mode picture taking. In single mode picture taking, the initial picture taking operation is completed, and once the switch SW3 of the shutter release button has been turned OFF, the second release operation is performed. Then, the aperture is returned to its open or initial starting position after a specified period of time has elapsed from the lowering of the mirror. Memorization or storage of the elapsed time are not required due to the release which occurs after the effects of the pulses from the return have disappeared.

During single mode picture taking operations, if the photographic speed is given priority, the storage function can be performed in the same way as in the continuous shooting mode. Resetting of the storage device 10 and a clearing of the memory contents at this time is not a problem due to the cancellation of the half-press time.

Figure 5A:
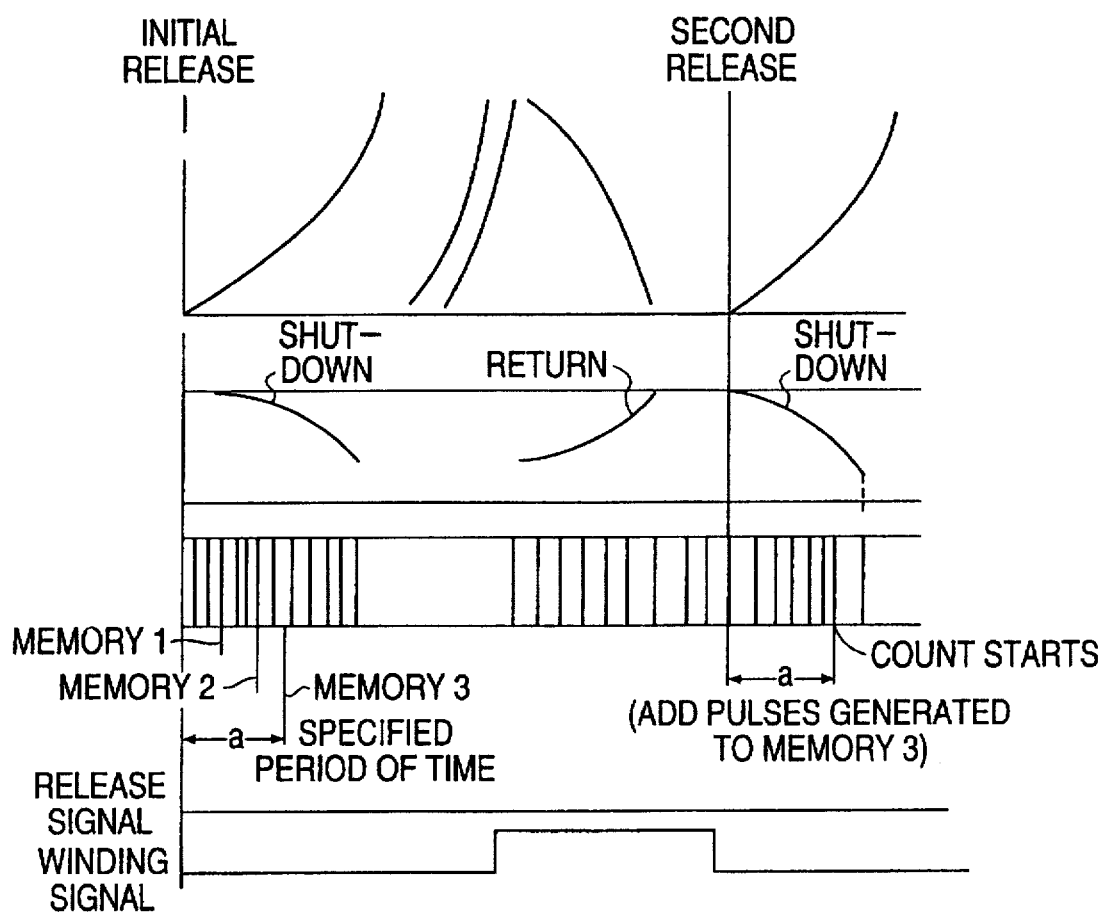
FIGS. 5(a) and 5(b) are charts that illustrate the pulse generating status realized during continuous photographic mode shooting (i.e., when pulses are stored for subsequent photographic operations).
Figure 5B:
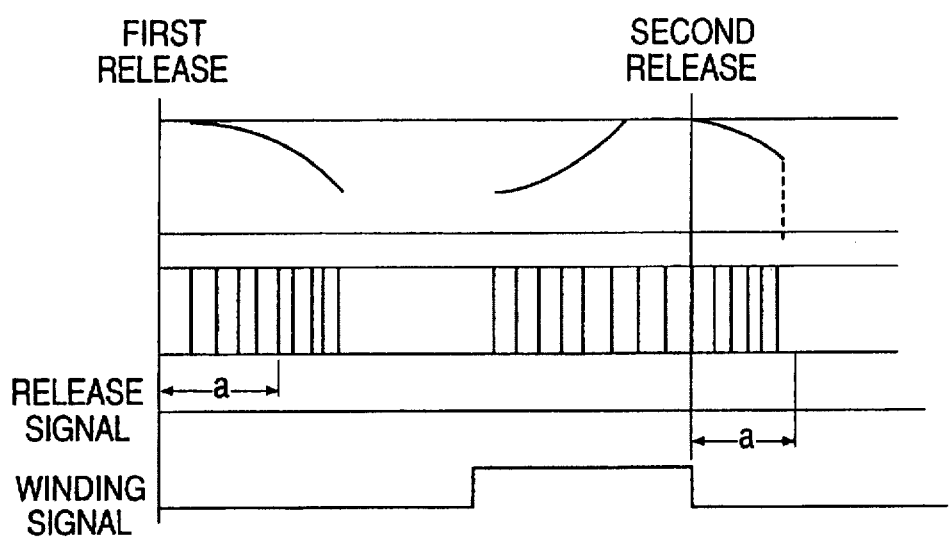

Referring now to FIGS. 5(a) and 5(b), therein depicted are charts illustrating the cases of continuous shooting in a continuous shooting mode. When shut-down is performed through the initial shutter release, the pulses generated within the specified period of time as well as the amount of time needed to generate such pulses are stored once or multiple times in storage device 10. Thereafter, if the generation of pulses reach a specified value, aperture control is performed by the electromagnetic drive device 31 as described above.

After aperture control and mirror raising, exposure is performed through the opening and closing of the shutter, and mirror lowering and aperture return are performed. However, the second release operation is started before the effects of the shut-down of the aperture return have disappeared.

The aperture control value in the case of FIG. 5(a) is compared with the previous (initial) control value, and shut-down is performed. In other words, because the number of aperture pulses is higher than in the initial specified period of time, the number of pulses subsequent to the initial specified period of time results, and control may be performed by adding the number of pulses of the initial specified period of time to the number of pulses generated after the initial specified period of time has elapsed.

In the same way, the aperture control value in the case of FIG. 5(b) is compared with the previous (initial) control value. In other words, because the number of aperture pulses is lower than in the initial specified period of time, the second shutter release is controlled based on the initial specified period of time. In this case, when storing has been performed once, control may be performed by computing the difference between the pulse generating time and the specified period of time as well as the number of pulses.

Or, in the case where storing has been performed multiple times, control may be performed by expressing the time and number of pulses as high order coefficients. The second and subsequent times may be stored, since the effects of aperture return are small when the initial control opens the aperture or during the specified period of time.

During continuous shooting operations, clearing of storage device 10 may be performed after detecting that SW3 has been turned OFF.

When picture taking in single mode, clearing of storage device 10 may be performed when the half-press information switch SW2 is turned OFF.

Thus, where the camera has continuous shooting capability, and it is configured in such a way that it counts signals generated according to the shut-down operation and stops the shut-down operation when the count value has reached a specified value, and it can perform exposure control throughout photometry. The automatic exposure camera according to the above-described preferred embodiment of the present invention is equipped with a photointerrupter 11 to generate signals according to aperture operation, a counter 9 to count the signals generated by photointerrupter 11 for a specified period of time and a storage device 10 to store the signals counted by counter 9. Moreover, the automatic exposure camera according to the preferred embodiment of the present invention is configured in such a way that, during continuous shooting operations, the initial picture taking operation is controlled through the generation of signals according to aperture operation, and subsequent picture taking operations are controlled through signals from the aforementioned storage device 10. Accordingly, continuous shooting can be performed without the aperture returning to an open or starting position and without the effects of that return operation.

Because control can be performed in shutter priority and without the influence of vibration from the return of the aperture to the open position that exists in the prior art cameras, picture taking can be performed without failing to carry out the intentions of the photographer.

As explained above, where a camera has continuous shooting capability, and it is configured in such a way that it counts the signals generated according to the shut down operation, the camera can stop aperture shut down operations when the count value has reached a specified value to thereby perform exposure control through a period in which photometry is performed. Accordingly, the present invention provides the following advantages.

In continuous shooting mode photography with the automatic exposure camera according to the preferred embodiment of the present invention, automatic control of subsequent picture taking operations is performed using the aperture data of the initial picture taking operation, and therefore, because picture taking can be executed continuously without the effects of returning the aperture to an open or starting position that exist in the prior art, an automatic exposure control camera which is capable of high-speed continuous shooting can be achieved.

Also, the camera according to the preferred embodiment of the present invention now allows continuous shooting in such a manner that photographers can carry our their intentions of fast photography since control operations are performed based on shutter priority and not on aperture photography. In other words, the embodiment of the present invention now allows the speed of photography to be limited only by film speed and speed of shutter operations.

Although preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. An automatic exposure camera having an aperture and a continuous shooting capability, comprising:
    a drive unit to drive the aperture;
    a signal pulse generator generating signal pulses in accordance with the motion of the aperture;
    a measuring unit counting the signal pulses generated by the signal pulse generator for a specified period of time;
    a storage unit storing the signal pulses counted by the measuring unit; and
    a controller, which during continuous shooting, controls an initial picture taking operation in accordance with the signal pulses generated according to the operation of the aperture, and controls subsequent picture taking operations in accordance with the signal pulses generated according to the aperture operation within the specified period of time during the initial picture taking operation and which are stored in the storage unit.

2. The automatic exposure camera of claim 1, wherein the storage unit cancels stored signal pulses from the storage unit when continuous shooting is stopped.

3. The automatic exposure camera of claim 1, wherein the controller controls the subsequent picture taking operations based on particular aperture settings corresponding to the initial picture taking operation and determined by the signal pulses stored in the storage unit.

4. The automatic exposure camera of claim 1, wherein the controller controls each subsequent picture taking operation after controlling said initial picture taking operation by the operation of the aperture corresponding to its immediately preceding picture taking operation.

5. The automatic exposure camera of claim 1, further comprising an aperture setting device to set the aperture for a particular picture taking operation independently of a previously set aperture starting position.

6. The automatic exposure camera of claim 1, wherein the signal pulse generator further comprises:
    a light emitter; and
    a photointerrupter including a slit-disk, the signal pulses being generated in accordance with the light emitted through the slits of the slit-disk by the light emitter, the signal pulses being counted by the measuring unit.

7. The automatic exposure camera of claim 1, wherein the measuring unit includes an adder circuit for counting the number of signal pulses generated by the signal pulse generator.

8. The automatic exposure camera of claim 1, wherein the storage unit is a random access memory (RAM) unit.

9. The automatic exposure camera of claim 8, wherein the random access memory unit (RAM) stores at least one number corresponding to a particular aperture setting.

10. An automatic exposure camera having an aperture and a continuous shooting capability, comprising:
    a drive unit to drive the aperture;
    an aperture value unit to determine an aperture setting for the aperture;
    a signal pulse generator generating signal pulses in accordance with the motion of the aperture;
    a measuring unit counting the signal pulses generated by the signal pulse generator for a specified period of time;
    a storage unit storing the signal pulses generated by the signal pulse generator; and
    a controller, which during continuous shooting, controls an initial aperture operation based on the signal pulses generated by the signal pulse generator and the aperture setting, and controls subsequent aperture operations based on the signal pulses stored by the storage unit.

11. A method for controlling aperture operations in an automatic exposure camera having a continuous shooting mode of operation, the method comprising the steps of:
    generating signal pulses in accordance with the operation of an aperture of the camera;
    counting the signal pulses generated during the generating step for a specified period of time;
    storing the generated signal pulses; and
    during continuous shooting operations of the camera, controlling an initial picture taking operation in accordance with the generation of signal pulses according to the aperture operation, and controlling subsequent picture taking operations in accordance with signal pulses generated according to the aperture operation within the specified period of time during the initial picture taking operation and which have been stored during the storing step.

12. An automatic exposure camera having continuous shooting capability to allow for continuous photographic operations, comprising:
    an aperture having a particular opening size corresponding to a set of parameters related to a first photographic operation; and
    an aperture drive device to drive the aperture and to realize high-speed continuous shooting by setting the aperture opening size for a second photographic operation without returning the aperture to an initial aperture starting position, and to drive the aperture based on shutter priority during subsequent aperture operations of the continuous shooting.

13. The automatic exposure camera of claim 12, wherein the aperture drive device controls the second picture taking operation based on particular aperture settings corresponding to the first picture taking operation.

14. The automatic exposure camera of claim 12, wherein the aperture drive device controls each photographic operation by the operation of the aperture opening size corresponding to an immediately preceding photographic operation.

15. The automatic exposure camera of claim 12, wherein the aperture drive device controls the setting of the aperture opening size for a particular photographic operation independently of a previously set aperture opening size.

* * * * *

UNITED STATES PATENT AND TRADEMARK OFFICE
CERTIFICATE OF CORRECTION

PATENT NO. : 5,710,950
DATED : January 20, 1998
INVENTOR(S) : Toshiaki HOZUMI

It is certified that error appears in the above-identified patent and that said Letters Patent is hereby corrected as shown below:

On the title page item [54], and column 1, line 2, after "SIGNAL" INSERT --GENERATION--.

Signed and Sealed this

Twenty-eighth Day of April, 1998

Attest:

BRUCE LEHMAN

Attesting Officer

Commissioner of Patents and Trademarks